US005638965A

United States Patent [19]

Mattingly et al.

[11] Patent Number: 5,638,965

[45] Date of Patent: Jun. 17, 1997

[54] CARTLESS PUSH-BACK RACK

[75] Inventors: James F. Mattingly, Louisville; Ellsworth H. Collins, Mt. Washington, both of Ky.; Daniel P. Wilson, Naperville, Ill.

[73] Assignee: The Interlake Companies, Inc., Louisville, Ky.

[21] Appl. No.: 362,828

[22] Filed: Dec. 23, 1994

[51] Int. Cl.$^6$ .......... A47F 5/00

[52] U.S. Cl. .......... 211/151; 211/59.2; 414/276

[58] Field of Search .......... 211/151, 59.2, 211/122; 414/276, 286, 267, 277, 278; 193/35 R, 35 SS, 35 F, 2 D

[56] References Cited

U.S. PATENT DOCUMENTS

| | | | |
|---|---|---|---|
| 442,044 | 12/1890 | Hatfield | 211/122 |
| 1,099,314 | 6/1914 | Pitkin | 193/35 R |
| 2,172,926 | 9/1939 | Wylie | 193/35 R |
| 3,686,888 | 8/1972 | Helton | 405/154 |
| 3,837,511 | 9/1974 | Howlett | 414/786 |
| 4,023,672 | 5/1977 | Haley | 193/35 R |
| 4,155,462 | 5/1979 | Bendel | 211/151 |
| 4,168,780 | 9/1979 | Parrott | 211/151 |
| 4,239,099 | 12/1980 | Williams et al. | 193/32 |
| 4,349,114 | 9/1982 | Vickers et al. | 211/151 |
| 4,436,200 | 3/1984 | Hodlewsky et al. | 198/851 |
| 4,467,725 | 8/1984 | Haldimann | 104/162 |
| 4,629,383 | 12/1986 | Buss | 211/59.2 X |
| 4,662,511 | 5/1987 | Greener | 193/2 D X |
| 4,715,765 | 12/1987 | Agnoff | 211/151 X |
| 4,988,251 | 1/1991 | Kinney | 414/276 |
| 5,096,050 | 3/1992 | Hodlewsky | 193/35 R X |
| 5,117,990 | 6/1992 | Krummell et al. . | |
| 5,137,159 | 8/1992 | Collins et al. | 211/151 |
| 5,178,288 | 1/1993 | Werner et al. | 211/151 |
| 5,203,464 | 4/1993 | Allen | 211/151 |
| 5,320,210 | 6/1994 | Van Den Bergh et al. | 414/286 X |
| 5,445,485 | 8/1995 | Poutet | 414/286 X |
| 5,538,384 | 7/1996 | Haldimann | 414/286 |

FOREIGN PATENT DOCUMENTS

| | | | |
|---|---|---|---|
| 1141231 | 12/1962 | Germany | 414/276 |

*Primary Examiner*—Robert W. Gibson, Jr.
*Attorney, Agent, or Firm*—Wheat, Camoriano, Smith & Beres, PLC

[57] ABSTRACT

A push-back rack with product support surfaces which are strung together and which move relative to the rack structure. In one embodiment, support surfaces include wheels or rollers, which roll on the rack frame. The support surfaces are connected together by flexible members. In another embodiment, the support surfaces are links of a chain and are connected together by pin and eye connections, and support rollers are provided on the rack rather than on the support surfaces.

9 Claims, 7 Drawing Sheets

34 37 28 26 24A 36 37 28 24B 37 28 26 36 37 28 24C 37 26 33 36 28 36

24F 24E 18 24D 34 48 44 24R 24A 24B 36 24C 38

28
37
36
28
37
36
33
24C
28
37
24B
26
26
24A
26
34
37
37
36
36
28
28
37
28

CARTLESS PUSH-BACK RACK

BACKGROUND OF THE INVENTION

There are many types of push-back rack arrangements, most of which include carts for supporting pallets. There are various techniques used for allowing one cart to roll over another so that more than one cart can nest in a storage bay, and so that the storage bay can hold several pallets of products. The carts ride on inclined rails, so they tend to roll forward, to the front of the rack.

In most of the prior art arrangements, there is a limitation to the number of carts that can be stored in a given bay, because, as the number of carts increases, the bay has to get wider and taller to handle more and more nested carts, creating a situation of diminishing returns until it becomes counterproductive to add to the depth of the rack. It is also necessary to make several different sizes of carts, with the first cart being the lowest and the last cart being the highest.

SUMMARY OF THE INVENTION

The present invention provides a push-back rack arrangement which does not require the bays to become wider or taller in order to accommodate more pallets, thus avoiding the problem of diminishing returns encountered by the prior art.

In the present invention, the rack may be made to handle as many pallets of products as is desirable, without wasting space.

The present invention provides a push-back rack arrangement which does not require the use of carts.

DESCRIPTION OF THE PREFERRED EMBODIMENT

Figure 1:
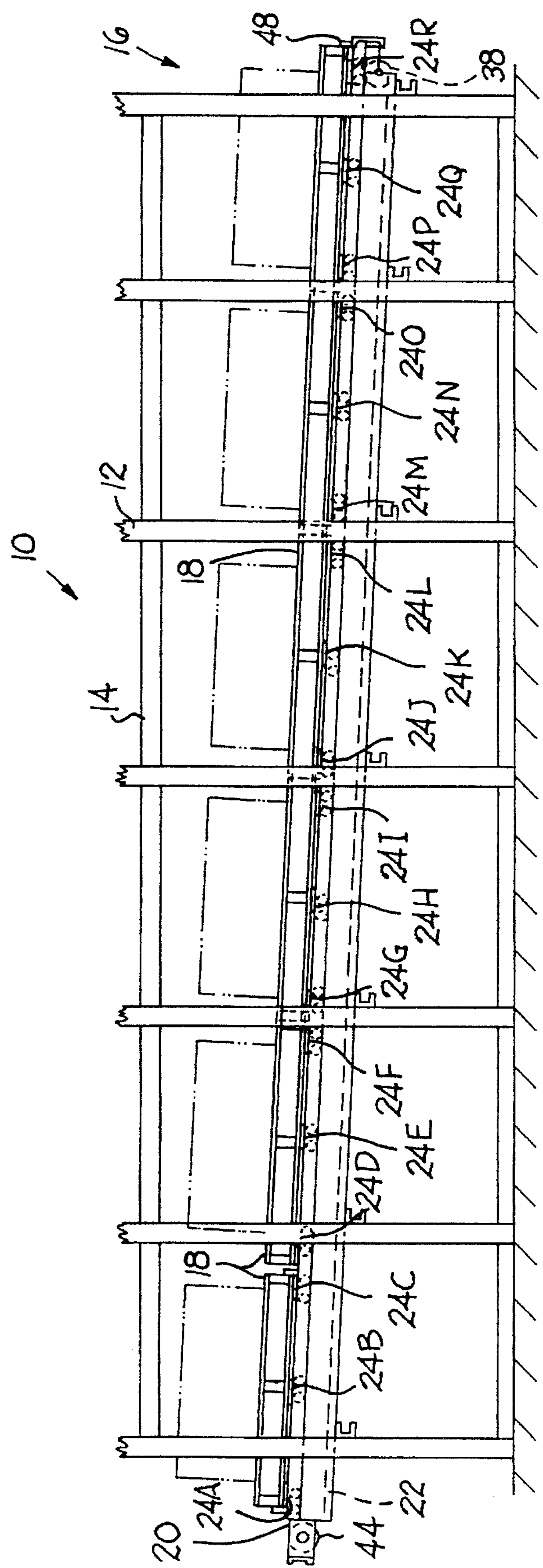
FIG. 1. is a schematic side view of one storage bay of a rack made in accordance with the present invention.

Looking first at FIG. 1, the rack 10 has a structure which includes vertical columns 12 and horizontal beams 14 interconnecting the columns 12. The storage bay 16 shown in FIG. 1 is made to support several pallets 18. The view in FIG. 1 shows the left upper rail 20 and left lower rail 22 of the bay 16. The right side of the bay 16 has a mirror image right upper and right lower rail (not shown in FIG. 1). The rails 20, 22 are inclined at an angle so that they go down from back to front. This causes the pallets to move toward the front of the rack 10 by gravity, as will be described later.

Figure 2:
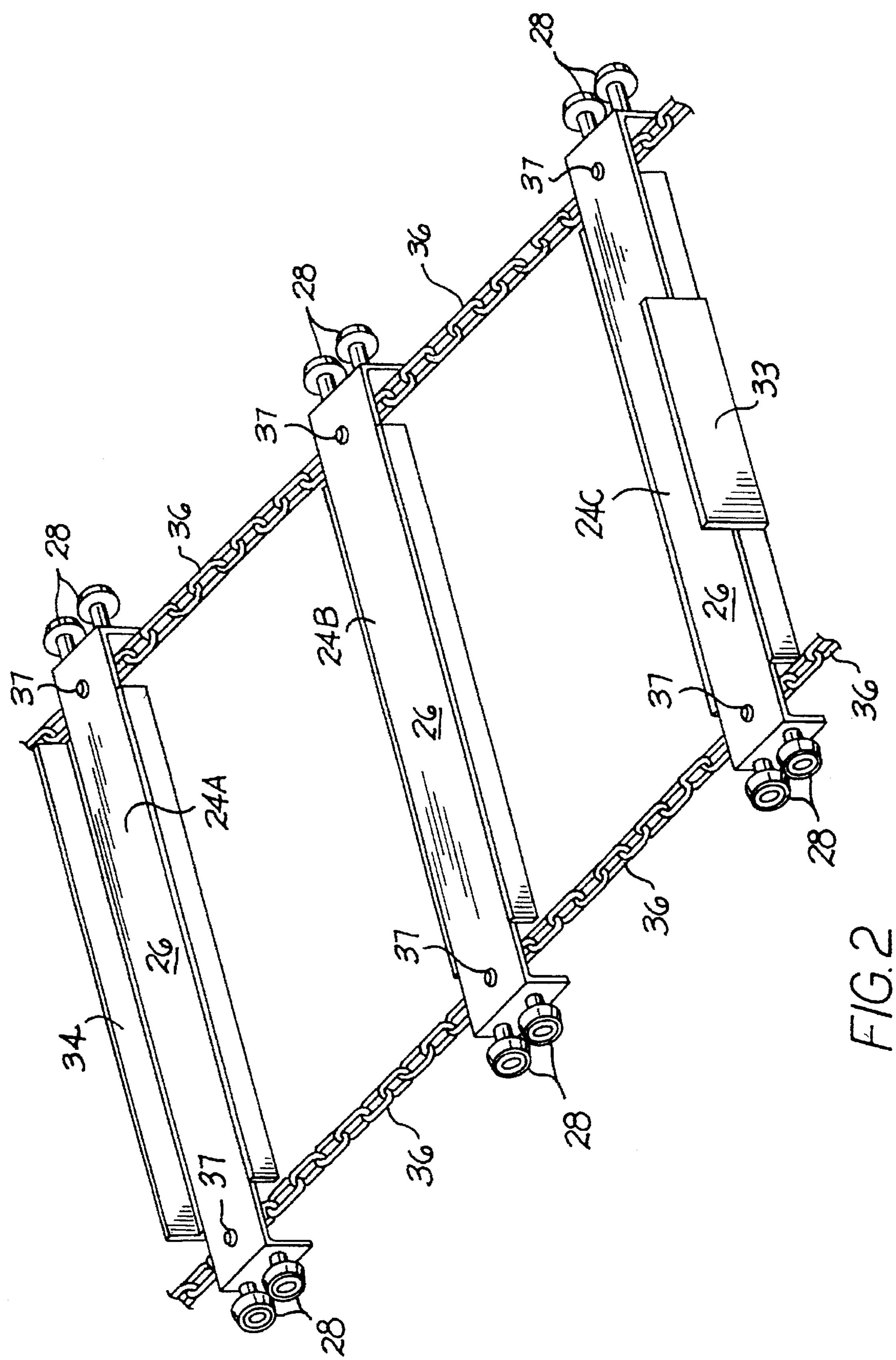
FIG. 2. is a perspective view of the portion of the rack of FIG. 1 which moves relative to the rack structure as products are put onto and taken off of the rack.

FIG. 2 shows the support members 24A–C, which support the pallets 18. Each support member 24 includes a product support surface 26. At the left and right ends of each product support member 24 are mounted rollers 28, which ride on their respective rails to support the products as they move along the rack 10. Each product support member 24 is connected to the next adjacent support members 24 by left and right chains 36. The product support members 24 are bolted to the chains 36 by means of bolts 37. The left and right chains 36 are formed in two complete loops, which, by staying in tension, maintain the correct distance between the support members 24.

Figure 3:
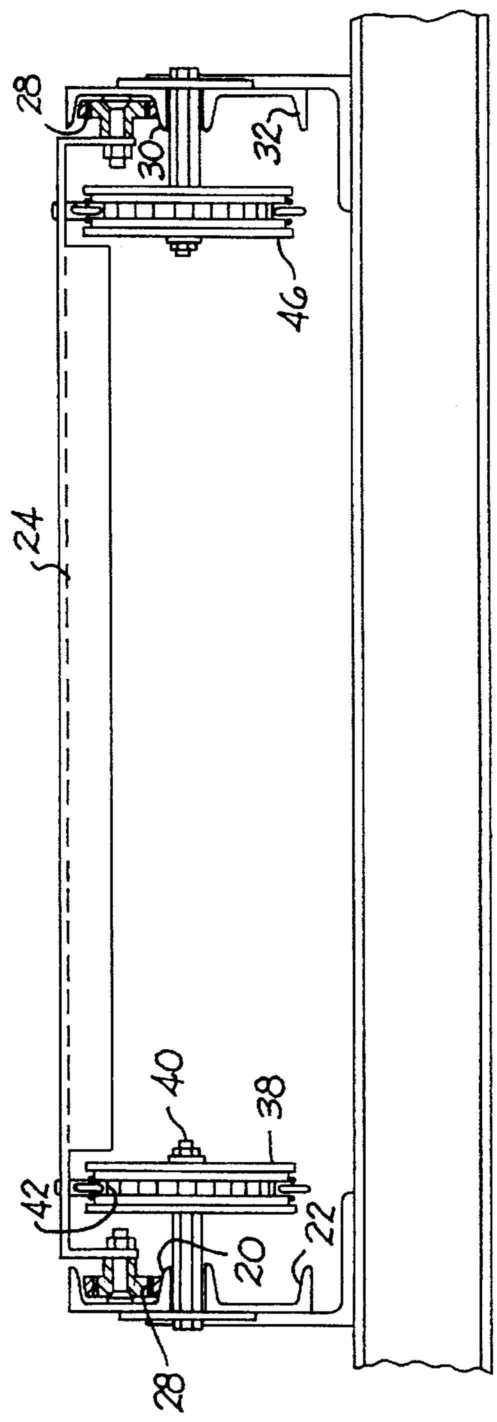
FIG. 3 is a front sectional view of the storage bay shown in FIG. 1, with no pallets on the rack.

As shown in FIG. 3, the rollers 28 on the left end of the product support members 24 ride in the left upper rail 20 and left lower rail 22. The rollers 28 on the right end of the support members 24 similarly roll in the upper and lower right rails 30, 32. The product support members 24D–R (shown in FIG. 1) can go around the front end of the left and right upper rails 20, 30 and then be supported by the left and right lower rails 22, 32 when they are not carrying a product.

Looking again at FIG. 2, the first product support member 24A has an upwardly-projecting back edge 34 which projects above the product support surface 26 to prevent the pallets from sliding off the back of that support member 24A. The third product support member 24C has a stop 33 on its front edge, which contacts the forward stop 48 on the rack (shown in FIG. 1) as the product support members 24 roll forward, so as to prevent the first, second, and third product support members 24A–C from moving down to the lower rails. This means that the first three product support members 24A–C are always on the upper rails 20, 30, even when they are not carrying a product.

Figure 4:
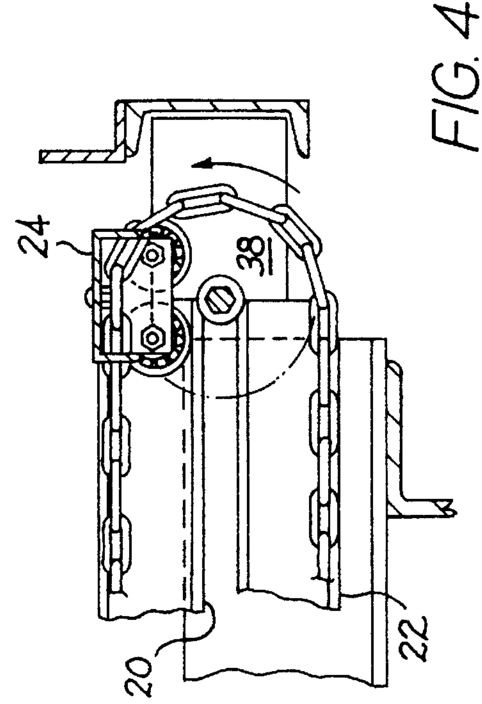
FIG. 4 is a side sectional view of the front portion of the storage bay shown in FIG. 1.

The chains 36 flex to go around the ends of the rails 20, 22, 30, 32, as shown in FIG. 4. As the chains 36 go around the ends of the rails, they are supported by smooth, toothless guide wheels 38, 46, helping to guide the rollers 28 from their respective top rail 20 (or 30) to their respective bottom rail 22 (or 32) and back again.

Figure 5:
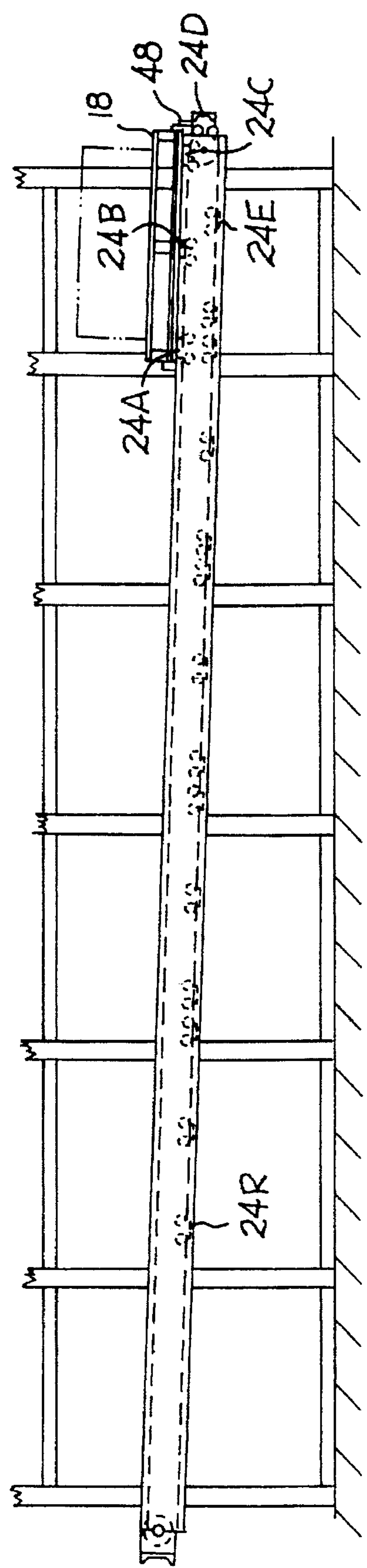
FIG. 5 is the same view as FIG. 1, but with only a single pallet loaded on the rack.

The support members 24 are mounted on the chains 36 at intervals so as to support the size of product they will carry. In most cases, the product will be carried on a standard pallet 18 as shown in these drawings. Preferably, three support members 24 will carry each pallet, with one near the front of the pallet, one near the middle of the pallet, and one near the back of the pallet. In FIG. 5, the first three product support members 24A–C carry the first pallet. The next support member 24D will carry the back of the second pallet, and so forth. It is desirable to load the pallets close together, so the distance between the third and fourth product support members 24C and 24D is relatively small.

FIG. 3 shows how the support members 24 ride on the rails. The left rollers 28 are shown riding on the left upper rail 20, and the left chain 36 is supported on the left forward guide 38, which is mounted on the rack frame so as to rotate about the axis of the bolt 40 as the chain 36 moves. The left forward guide 38 has a central groove 42 around its circumference which receives the chain 36. Similarly, there is a left rear guide 44, which is shown in FIG. 1, and which is identical to the left forward guide 38. The left rear guide 44 guides the chain 36 around the back of the left rails 20, 22 so that the left chain 36 makes a loop around the forward and rear left guides 38, 44. The same thing happens on the right side of the storage bay 16, where the right chain 36 is received in the right forward guide 46 (shown in FIG. 3) and in the right rear guide (not shown).

FIG. 4 shows the left side of one of the support members 24 at the forward end of the upper rail 20, as it is about to go around to the bottom rail 22, or as it has just come up from the bottom rail 22. As the chains 36 go around the end of their forward guides 38, 46, they guide the support members 24 around the front of the rails so the support members 24 make the transition from riding on the upper rails 20, 30 to riding on the lower rails 22, 32 and back again.

FIG. 5 shows the position of the storage rack 10 as the first pallet load is being loaded on the rack 10. When the forklift truck approaches the rack, the third product support member 24C is at the very front of the rack 10, prevented from going down to the lower rails by the forward stop 48. The forklift sets the first pallet 18 down on the first three support members 24A–C. The first pallet 18 is prevented from falling out the front of the rack by the forward stop 48 at the front of the rack and by the stop 33 on the third support member 24C, which was shown in FIG. 2.

Figure 6:
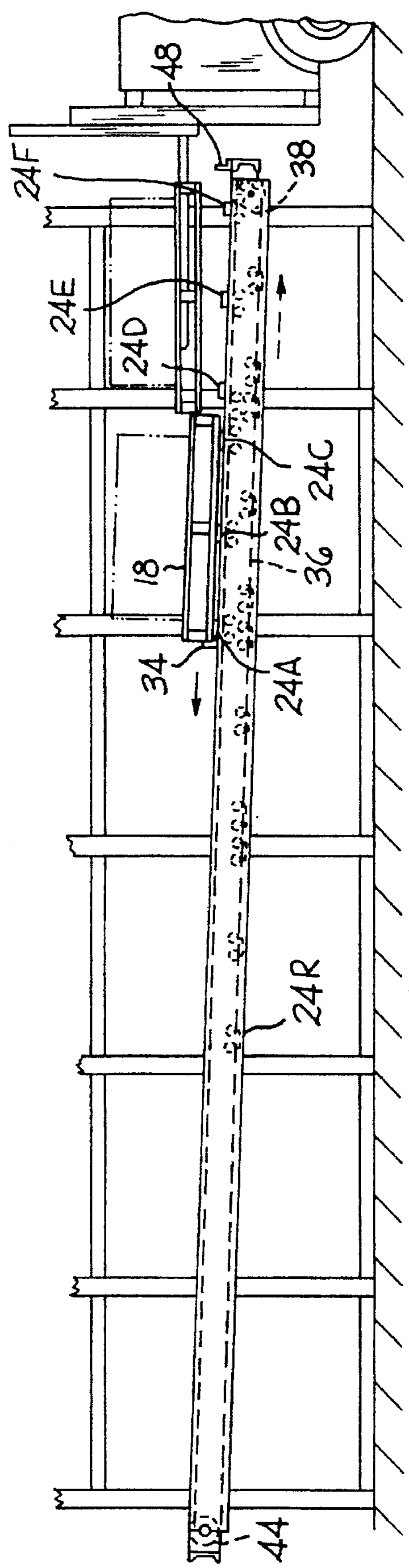
FIG. 6 is the same view as FIG. 5, but with a second pallet being added onto the rack.

Then, the forklift comes to the same bay 16 with a second loaded pallet 18, as shown in FIG. 6. The forklift operator causes the second pallet 18 to contact the first pallet 18 and to push the first pallet 18 up into the rack 10, causing the chains 36 to move around the front and rear guides 38, 46, 44, and bringing three more support members 24D, E, and F up onto the upper rails 20, 30. The first pallet 18 is prevented from sliding off the back of the support member 24A by engaging the upward projection 34 at the back of the first support member 24A. The forklift then deposits the second pallet 18 onto the supports 24D, E, and F, and the forward stop 48 prevents the second pallet 18 from sliding off the front of the rack 10.

This procedure is followed until all the pallets are loaded onto the rack 10. It is only necessary to have enough pallet support members 24 to carry the number of pallets that would fill up the depth of the rack 10. In this preferred embodiment, there are 18 support members 24 which can carry six pallets 18. If the rack were deeper, there would be more support members 24 to carry more pallets. The last product support member 24R is tied to the first product support member 24A by means of the chains 36, which string together all the product support members 24A–R and which define the distances between the product support members. The chains 36 are kept in tension, so the distances between adjacent support members do not change appreciably during operation of the rack. It is not necessary for the product support members 24 to be able to rotate around the back guides 44. This preferred embodiment of the invention shows segments of the same chain 36 extending from one product support member to the other. It is not absolutely necessary that it be a continuous chain, although a continuous flexible element is preferable. Also, cables or other flexible connectors could be used in the place of the chain. The cables of chain shown in FIGS. 1–7 are non-precision flexible connectors, which can flex in multiple directions, about multiple axes. The precision chain links shown in FIGS. 8–14 are flexible connectors that can flex only about one axis.

To unload the products from the rack 10, the reverse procedure is used. The last product loaded into the rack is the first product removed from the rack. Starting with six pallets on the rack, as shown in FIG. 1, the forklift would remove the sixth pallet 18 from the front of the rack 10, and the weight of the other pallets 18 on the inclined rails 20, 30 would cause the chains 36 to move around the guides until the fifth pallet 18 is at the front of the rack 10 and the support members 24P, Q, and R are riding on the lower rails 22, 32. Then, the forklift would remove the fifth pallet 18, and the chains 36 would again move forward, bringing the fourth pallet 18 to the front of the rack 10 and moving the support members 24M, N and O down to the lower rails 22, 32. This procedure is repeated until all the pallets 18 are removed from the rack and only the first three product support members 24A–C are on the top rails 20, 30. The first three product support members 24A–C are prevented from going around the front end of the rack by the upwardly-projecting stop 33 on the third product support member 24C contacting the forward stop 48.

Figure 7:
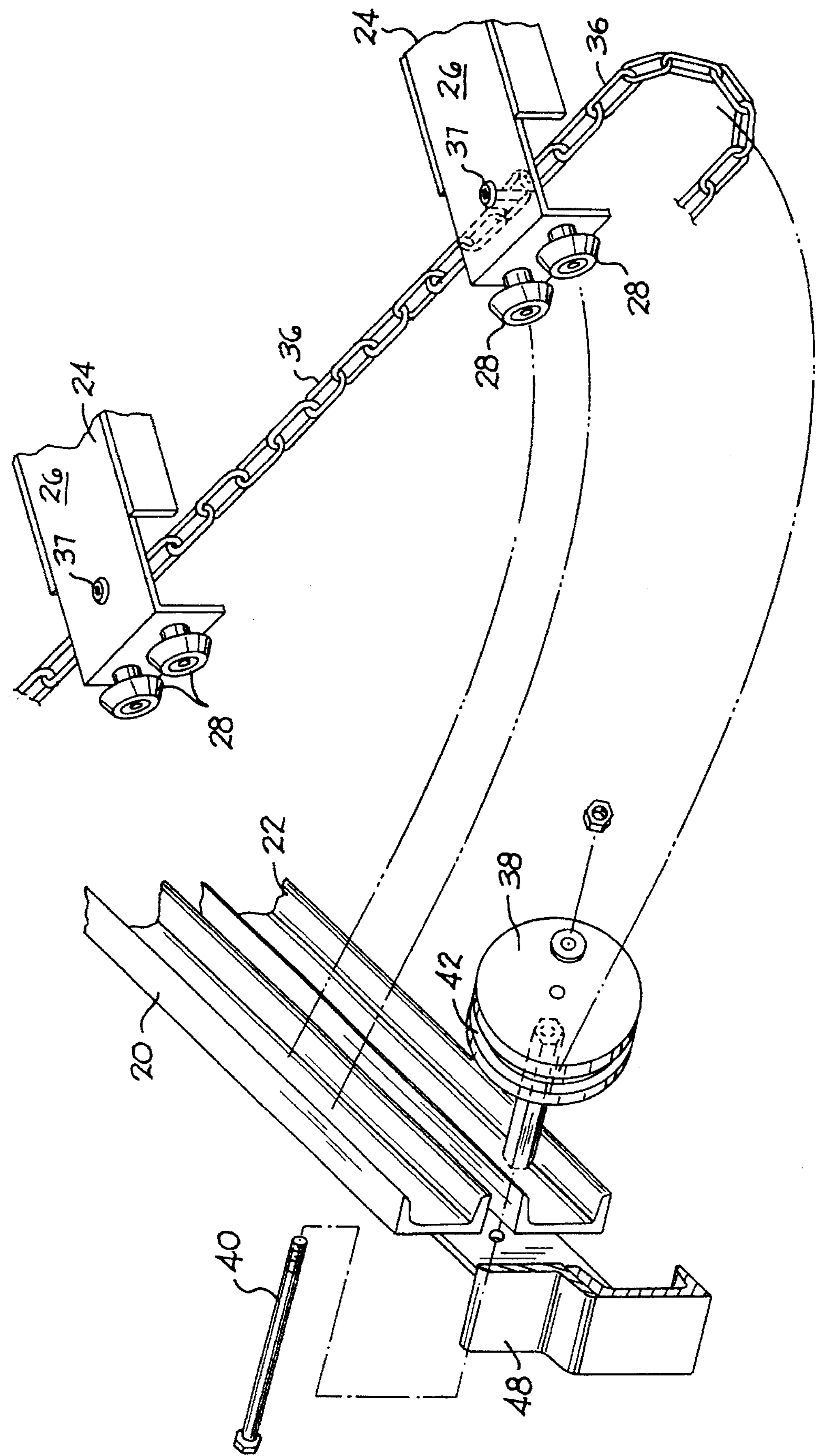
FIG. 7 is an exploded perspective view of a portion of the front of the rack of FIG. 1.
Figure 8:
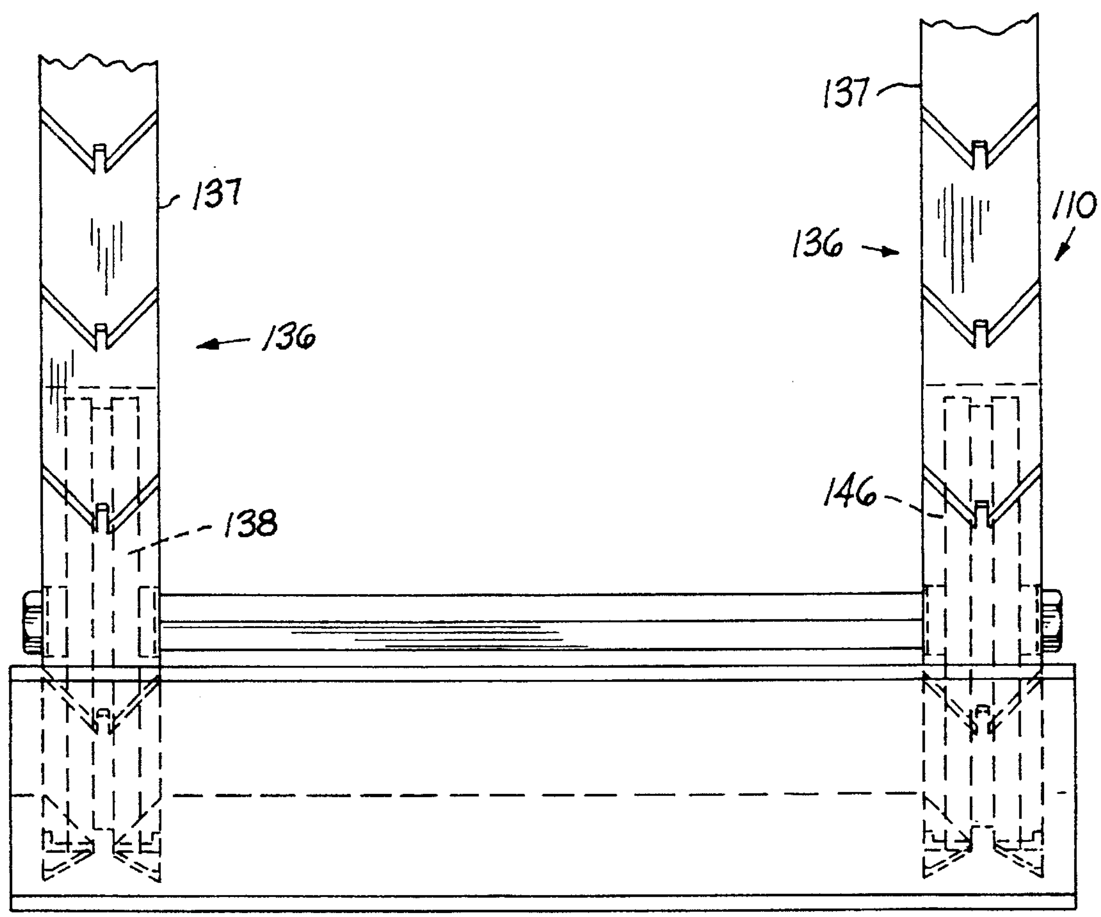
FIG. 8 is a broken away top view of a portion of a storage rack which shows a second embodiment of the invention.
Figure 10:
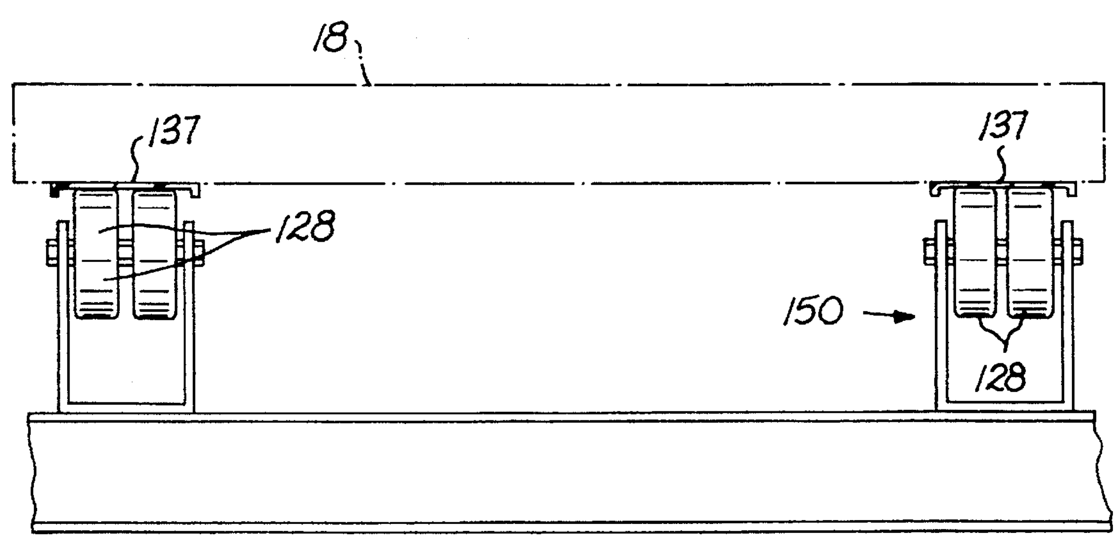
FIG. 10 is a view taken along the section 10—10 of FIG. 9.
Figure 12:
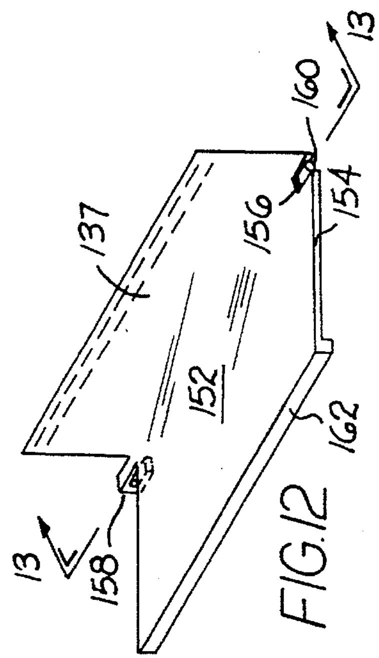
FIG. 12 is a perspective view of one of the links of FIG. 11.
Figure 13:
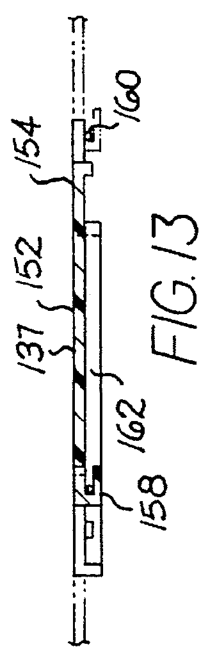
FIG. 13 is a view of the link of FIG. 12 taken along the section 13—13, with two adjacent links shown in phantom.
Figure 14:
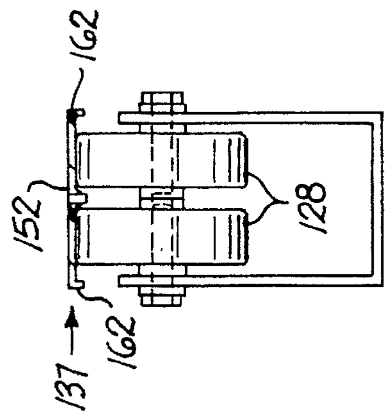
FIG. 14 is a front sectional view of one of the links of FIG. 11 being supported on wheels.
Figure 11:
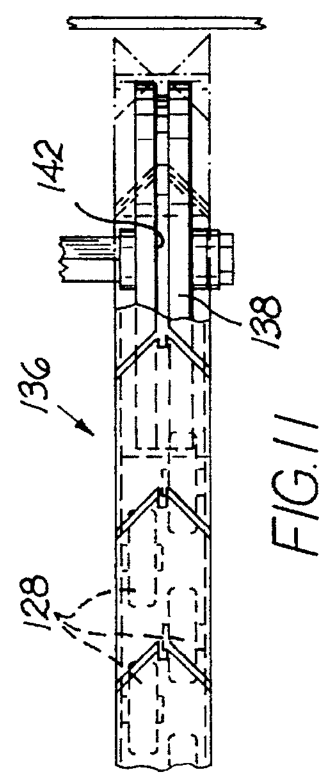
FIG. 11 is a top view, partially broken away, of one of the carrier portions of FIG. 10.
Figure 9:
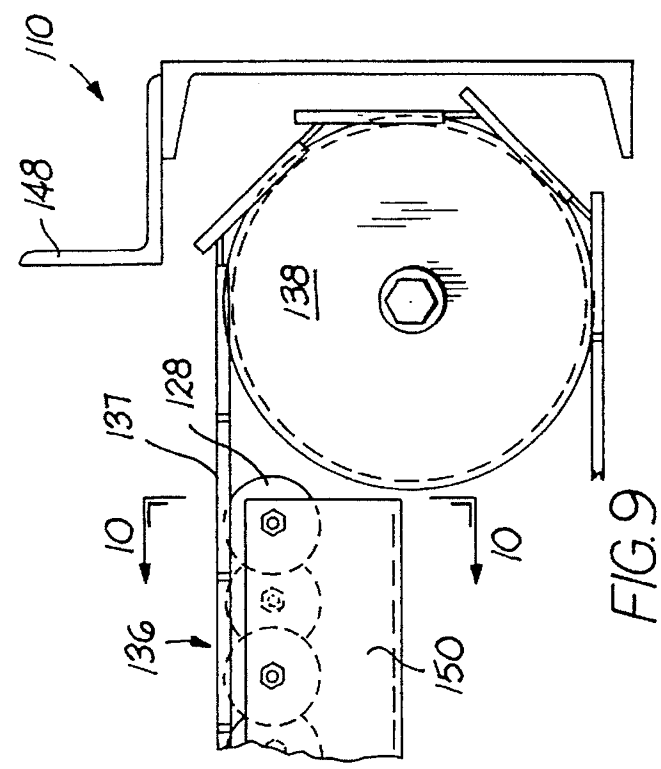
FIG. 9 is a side sectional view of the portion of the rack of FIG. 8.

FIG. 7 is an exploded perspective view, showing the upper and lower left rails 20, 22, the guide wheel 38, the stop 48, the chain 36, the carriers 24, and the wheels 28, which support the carriers 24.

FIGS. 8–14 show a second embodiment of the invention, which functions similarly to the first embodiment, except that the support wheels 128 are mounted on the conveyor frame 150, and a flat-top chain 136 is supported on the support wheels 128 as it moves forward and back in the rack 110. In FIGS. 8–14, the support wheels or rollers 128 are interposed between the product support members 136 and the frame member 150 by being mounted on the frame member, while, in FIGS. 1–7, the support wheels or rollers 28 are interposed between the product support members 26 and the frame member 20, 22, 30 or 32 by being mounted on the product support members 26. The pallets 118 ride directly on the flat-top chain 136 as they are carried in the rack.

As with the first embodiment, the wheels 128 are mounted at an incline going down toward the front. Thus, in this embodiment, the wheels form the inclined frame members, so, again, the product support members (or chain links 137) are supported on the inclined frame members 128, and the weight of the products brings the chain around, carrying products toward the front of the rack 110. Left and right guide wheels 138, 146 guide the chains 136 around the front of the rack. A stop 148 prevents the front-most pallet 118 from falling out of the front of the rack 110. In this embodiment, unlike the first embodiment, the chain 136 does not have to be stopped at a certain location in order to receive pallets, because the entire top of the chain 136 is flat and can receive pallets.

Each chain link 137 has a flat top 152, a forward projection 154, an indentation 156 with a pin 160 in the forward projection 154 for receiving the back of the next link 137, and an eye 158 in the back of the link which hooks over the pin 160 of the next link. The eye 158 and pin 160 form a flexible connector between the links, so the links can move around the guide wheels 138, 146. The guide wheels 138, 146 have a central groove 142 which receives the downwardly-extending eye portions 158 of the chain 136, to help keep the chain 136 tracking properly as it goes around the end. The side edges 162 of the link 137 turn downwardly, to wrap around the sides of the respective guide wheel 138, 146 and to keep the links 137 centered on the support wheels 128.

This second embodiment functions essentially the same way as the first. A pallet 118 is placed on the chain 136 and is prevented from falling off the front of the rack 110 by the front stop 148. The forklift brings the next pallet 118 and pushes the first pallet back, causing the chain 136 to move backward, supported on the support wheels 128. This continues until all the pallets 118 are loaded onto the rack 110. As the pallets are unloaded, the chain 136 moves forward by gravity, bringing the next pallet to the front of the rack, and so forth, until all the pallets are removed, and the chain 136 is empty again.

It will be obvious that modifications may be made to the embodiments described above without departing from the scope of the present invention.

What is claimed is:

1. A gravity-feed rack for storing products, said rack having a front and a back and comprising:

structure defining at least one storage bay, and a plurality of inclined frame members mounted on said structure for carrying products to the front of the rack;

a plurality of adjacent movable product support members supported by at least one of Said frame members;

flexible connectors connected between said adjacent movable product support members so as to form a flexible string of movable product support members, wherein said plurality of inclined frame members include:

upper and lower left rails and upper and lower right rails, said lower rails lying directly below their respective upper rails, and said left and right rails being parallel to each other, wherein said movable product support members include a product support surface and left and right rollers mounted so as to support said product support surface, said left and right rollers riding on said left and right rails, respectively.

2. A gravity-feed rack for storing products, said rack having a front and a back, and comprising:

a structure defining at least one storage bay, and a plurality of inclined frame members mounted on said structure for carrying products to the front of the rack;

a plurality of adjacent movable product support members supported by at least one of said frame members; rollers interposed between said product support members and said at least one frame member so that said product support members roll forward and backward on said at least one frame member; and flexible connectors connected between said adjacent movable product support members so as to form a flexible string of movable product support members, and further comprising a guide for guiding said string of product support members around the front of the rack for loading or unloading products, said guide being a smooth, toothless guide wheel.

3. A gravity-feed push-back rack, having a front and back, for receiving products at the front of the rack and dispensing products at the front of the rack in a last-in-first-out mode, comprising:

at least one storage bay, including left and right inclined frame members;

a plurality of movable product support members, each of said product support members being supported by at least one of said frame members; and a plurality of flexible members, each of said flexible members connecting one of said movable product support members to the next adjacent movable product support member to form a string of product support members, wherein there is a distance between said left and right inclined frame members; and each of said movable product support members includes a product support surface which substantially spans the distance between said left and right inclined frame members; wherein each of said inclined frame members includes upper and lower rails; and further comprising left and right rollers mounted so as to support said product support surface, with said left roller adapted to ride in said upper and lower left rails and said right roller adapted to ride in said upper and lower right rails, such that, when said product support surface is carrying a product, said rollers ride in said upper rails and when said product support surface is not needed to support a product it can be under the upper rails, with said rollers riding in the lower rails.

4. A storage rack, comprising:

a frame defining at least one storage bay;

a plurality of rollers rotatably mounted on said frame in said at least one bay at a downward incline from a back to a front of said bay;

a flat-top chain supported on said rollers so as to receive products, such that, when a plurality of products is on top of said chain and the front-most product is removed, the chain will, by the force of gravity, move to bring the next product to the front of the rack.

5. A storage rack for storing products, including a structure defining at least one storage bay, a front and a back, and having a plurality of inclined frame members mounted or said structure for carrying products to the front of the rack;

a plurality of adjacent movable product support members supported by at least one of said frame members; and flexible connectors connected between said adjacent movable product support members so as to form a flexible string of movable product support members, wherein said product support. members are flat top chain links and said flexible connectors include pin and eye connections between said links, wherein said inclined frame members include rollers, which are mounted on the rack at an incline and which support said chain links.

6. A gravity-feed rack for storing products, said rack having a front and a back, and comprising:

a structure defining at least one storage bay, and a plurality of inclined frame members mounted on said structure for carrying products to the front of the rack;

a plurality of adjacent movable product support members supported by at least one of said frame members; rollers interposed between said product support members and said at least one frame member so that said product support members roll forward and backward on said at least one frame member; and flexible connectors connected between said adjacent movable product support members so as to form a flexible string of movable product support members, wherein said rollers are mounted on said at least one frame member.

7. A gravity-feed rack for storing products as recited in claim 1, wherein said flexible connectors are non-precision connectors, which are able to flex about multiple axes.

8. A gravity-feed rack for storing products as recited in claim 3, wherein at least one of said product support members includes an upwardly-projecting back edge against which a pallet may push to push the support members backwards on the rack.

9. A gravity-feed rack for storing products as recited in claim 2, wherein at least one of said product support members includes an upwardly-projecting back edge against which a pallet may push to push the support members backwards on the rack.

* * * * *